United States Patent
Sato et al.

(10) Patent No.: US 10,072,987 B2
(45) Date of Patent: Sep. 11, 2018

(54) TEMPERATURE SENSOR

(71) Applicant: DENSO CORPORATION, Kariya, Aichi-pref. (JP)

(72) Inventors: Motoki Sato, Kariya (JP); Tsunenobu Hori, Kariya (JP)

(73) Assignee: DENSO CORPORATION, Kariya (JP)

( * ) Notice: Subject to any disclaimer, the term of this patent is extended or adjusted under 35 U.S.C. 154(b) by 518 days.

(21) Appl. No.: 14/813,322

(22) Filed: Jul. 30, 2015

(65) Prior Publication Data

US 2016/0033337 A1 Feb. 4, 2016

(30) Foreign Application Priority Data

Jul. 31, 2014 (JP) .................. 2014-156139
Feb. 27, 2015 (JP) .................. 2015-038314

(51) Int. Cl.
 *G01K 7/00* (2006.01)
 *G01K 1/08* (2006.01)
 *G01K 7/22* (2006.01)

(52) U.S. Cl.
 CPC ............... *G01K 1/08* (2013.01); *G01K 7/22* (2013.01)

(58) Field of Classification Search
 CPC .......... H01C 1/024; H01C 1/028; G01K 1/08; G01K 7/22
 USPC ............... 374/28, 229, 306–320, 237–276
 See application file for complete search history.

(56) References Cited

U.S. PATENT DOCUMENTS

| 3,393,448 A * | 7/1968 | Harget .................. H01C 7/045 252/520.21 |
| 3,815,074 A | 6/1974 | Nagata |
| 3,820,239 A | 6/1974 | Nagata |
| 2013/0077653 A1 | 3/2013 | Koshimizu et al. |
| 2016/0025574 A1 | 1/2016 | Sato et al. |
| 2016/0025576 A1 | 1/2016 | Sato et al. |

FOREIGN PATENT DOCUMENTS

| JP | 62-189701 | 8/1987 |
| JP | 63-78502 | 4/1988 |
| JP | 2005-294653 | 10/2005 |
| JP | 2005294653 A * | 10/2005 |
| JP | 2011-232066 | 11/2011 |
| JP | 2011232066 A * | 11/2011 |
| JP | 2013-072769 | 4/2013 |
| JP | 2014-16158 | 1/2014 |

* cited by examiner

*Primary Examiner* — Lisa Caputo
*Assistant Examiner* — Janice M Soto
(74) *Attorney, Agent, or Firm* — Nixon & Vanderhye P.C.

(57) ABSTRACT

A temperature sensor includes a thermo-sensitive element, a pair of element electrode wires electrically connected to the thermo-sensitive element, a sealing body covering the thermo-sensitive element and part of the pair of the element electrode wires, and a tablet formed with a pair of insertion holes through which the pair of the element electrode wires pass. An air bubble is formed at a position within the glass sealing body on a distal end side opposite to the tablet. The center of the air bubble is located within the outline of the thermo-sensitive element when viewed in the axial direction of the pair of the element electrode wires.

6 Claims, 5 Drawing Sheets

TEMPERATURE SENSOR

This application claims priority to Japanese Patent Application No. 2014-156139 filed on Jul. 31, 2014 and No. 2015-38314 filed on Feb. 27, 2015, the entire contents of which are hereby incorporated by reference.

BACKGROUND OF THE INVENTION

1. Field of the Invention

The present invention relates to a temperature sensor.

2. Description of Related Art

Various apparatuses including automobiles are provided with temperature sensors as described in Japanese Patent Application Laid-open No. 2011-232066. The temperature sensor described in this patent document includes a thermistor element, a tablet, and a glass sealing part covering the thermistor element. The glass sealing part includes a body section located adjacent to the distal end surface of the tablet, and a head section that covers the thermistor element. The external shape of the glass sealing part is widest at a position on a cross-section that crosses the thermistor element in the head section. The body section is formed with a constriction at which the outer diameter thereof is minimum. Accordingly, the thickness of the glass sealing part is larger at its portion covering the periphery of the thermistor element than at the other portions thereof.

However, the above temperature sensor described in the above patent document has a problem as described below. The temperature sensor is used for a hydrogen tank of a fuel cell vehicle, for example, to detect the temperature in the hydrogen tank, a filling rate of hydrogen into the hydrogen tank being controlled based on the detected temperature. Shock and high pressures occur in the hydrogen tank at the time of filling hydrogen into the hydrogen tank. Accordingly, the thickness of the glass sealing part has to be increased at the head section and the body section including the constriction. However, if the amount of material for forming the glass sealing part is excessively increased to increase the thickness, it is likely that formation failure occurs in the glass sealing part, as a result of which the yield and productivity are lowered. Incidentally, the same problem occurs for uses other than hydrogen tanks, which require high resistivity to pressure, thermal shock and vibration.

SUMMARY

An exemplary embodiment provides a temperature sensor including:

a thermo-sensitive element;

a pair of element electrode wires electrically connected to the thermo-sensitive element;

a sealing body covering the thermo-sensitive element and part of the pair of the element electrode wires; and a tablet formed with a pair of insertion holes through which the pair of the element electrode wires pass, wherein an air bubble is formed at a position within the glass sealing body on a distal end side opposite to the tablet, and a center of the air bubble is located within an outline of the thermo-sensitive element when viewed in an axial direction of the pair of the element electrode wires.

According to the exemplary embodiment, there is provided a temperature sensor, an amount required for forming a glass sealing body of which can be reduced while ensuring a sufficient strength.

Other advantages and features of the invention will become apparent from the following description including the drawings and claims.

PREFERRED EMBODIMENTS OF THE INVENTION

Figure 1:
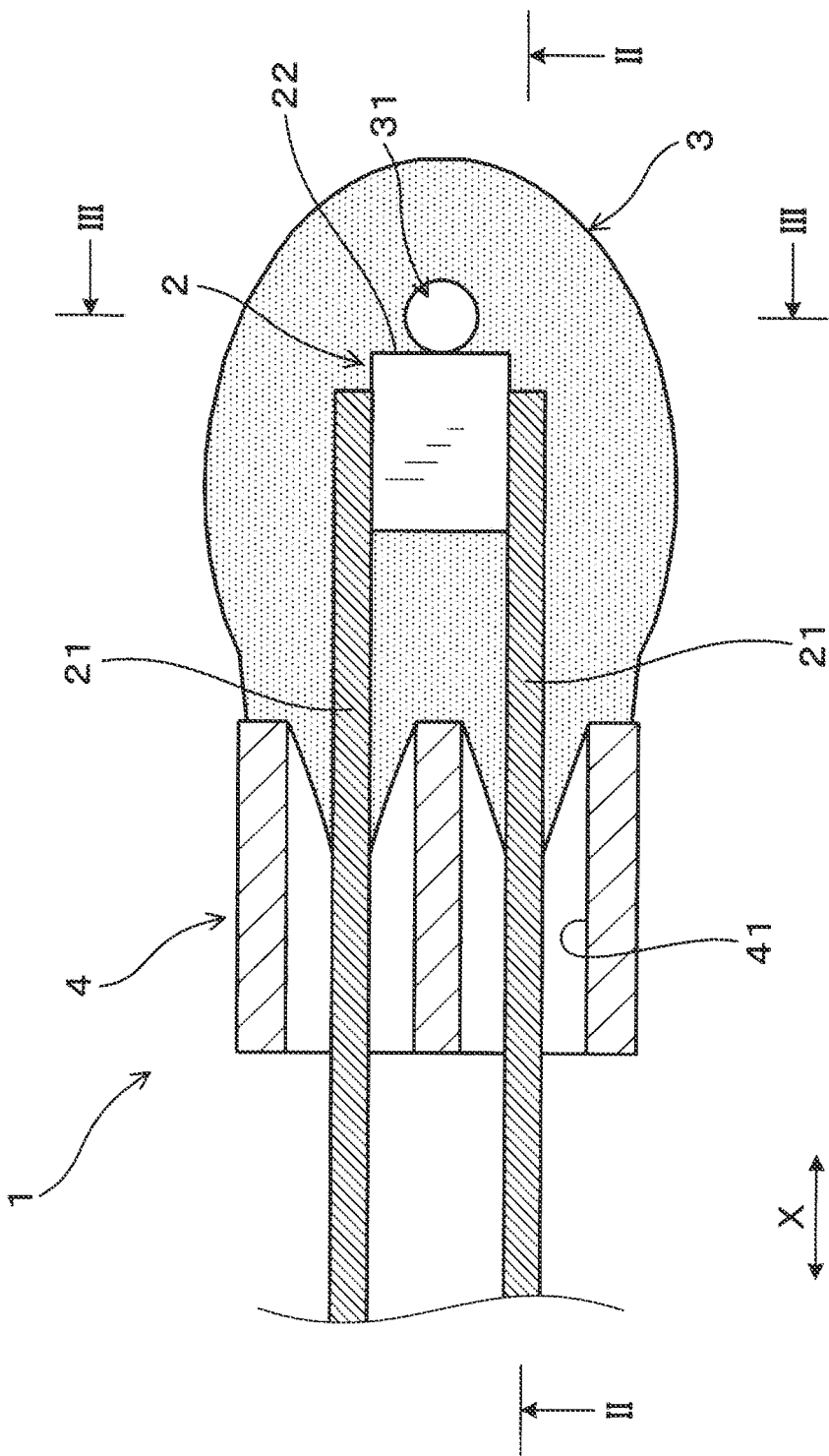
FIG. 1 is a diagram showing the structure of a temperature sensor according to an embodiment of the invention.
Figure 2:
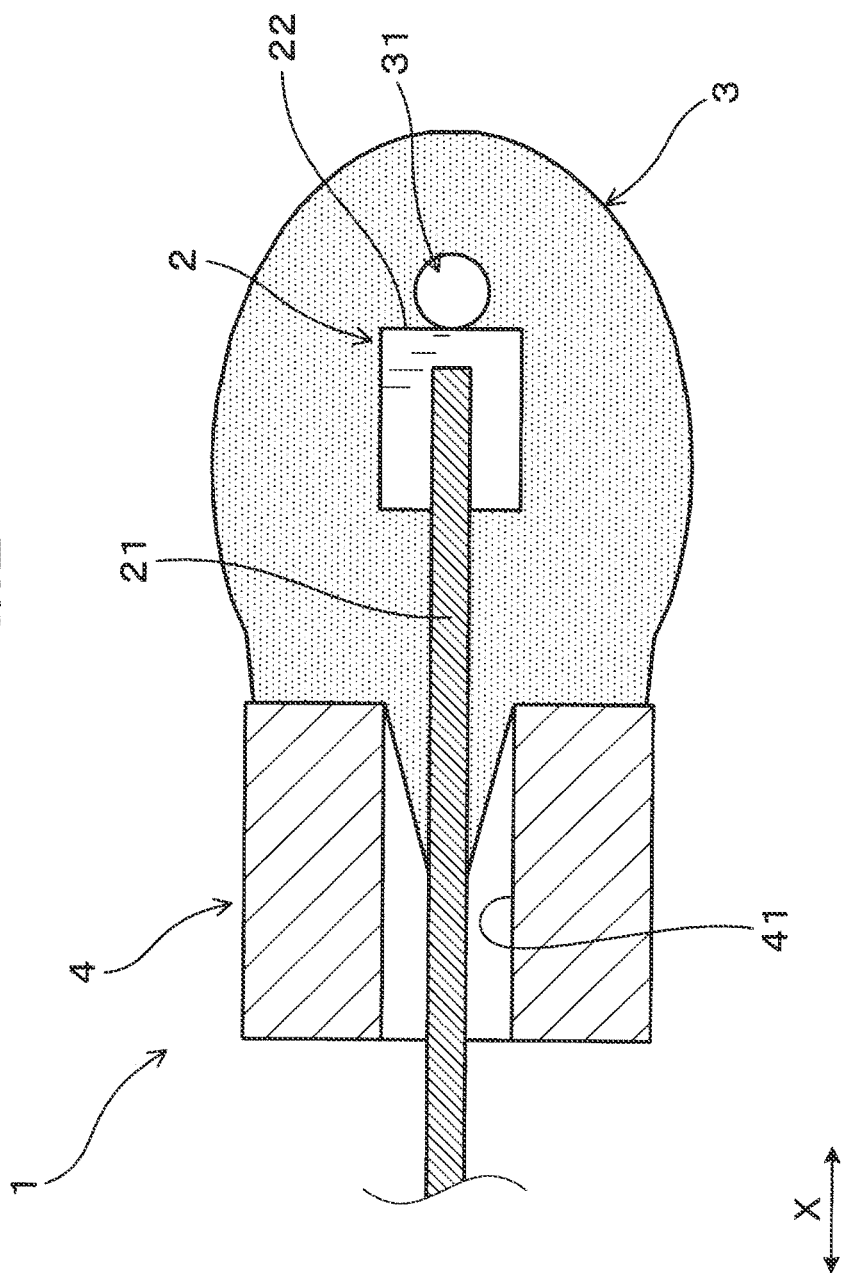
FIG. 2 is a cross-sectional view of FIG. 1 taken along line II-II.

A temperature sensor 1 according to an embodiment of the invention is described with reference to FIGS. 1 to 3. As shown in FIGS. 1 and 2, the temperature sensor 1 includes a thermo-sensitive element 2, a pair of element electrode wires 21 electrically connected to the thermo-sensitive element 2, a glass sealing body 3 which covers the thermo-sensitive element 2 and part of the pair of the element electrode wires 21, and a tablet 4 formed with a pair of insertion holes 41 through which the pair of the element wires 21 pass. An air bubble 31 is formed within the glass sealing body 3 at a position opposite to the side on which the tablet 4 of the thermo-sensitive element 2 is disposed. The center of the air bubble 31 is located within an outline 201 of the thermo-sensitive element 2 when viewed in the axial direction X of the pair of the element wires 21.

In the following description, the "distal end side" means a side in the axial direction X on which the thermo-sensitive element 2 is disposed, and the "proximal end side" means a side to which the element electrode wires 21 extend from the thermo-sensitive element 2. The temperature sensor 1 can be used for a hydrogen tank of a fuel cell vehicle to control hydrogen filling rate in accordance with the temperature in the hydrogen tank for reducing the hydrogen filling time.

The thermo-sensitive element 2, which is formed of a resistance temperature detector, is sandwiched and fixed between the element electrode wires 22 which are parallel to each other. The thermo-sensitive element 2, which is formed in a rectangular shape, is joined to the element electrode wires 21 in advance. The outline 201 of the thermo-sensitive element 2 forms a square of height of 0.6 mm and width of 0.5 mm when viewed in the axial direction X. The diameter R0 of an inscribed circle 202 inscribed within the outline 201 of the thermo-sensitive element 2 is 0.5 mm.

The element electrode wire 21 is made of platinum alloy, and formed in a columnar shape extending in the axial direction X. The platinum alloy is made of Pt as a base material containing 20 wt % of Ir (iridium). Accordingly, the content A of Ir of the element electrode wire 21 is in the range of 0 wt % < A ≤ 20 wt %. The linear expansion coefficient $\alpha_r$ of the element electrode wire 21 is $8.4 \times 10{-}6/°C$. In this embodiment, the element electrode wire 21 is made of platinum alloy, however, instead, it may be made of pure platinum.

The tablet 4 is made of ceramic material containing forsterite as a base material formed in a columnar shape. The tablet 4 is formed with the pair of the insertion holes 41 penetrating through the tablet 4 in the axial direction X. The diameter of the insertion hole 41 is slightly larger than the diameter of the element electrode wire 21 so that the element electrode wire 21 can be inserted into the through hole 41. Most preferably, the material of the tablet 4 is forsterite. However, it may be ceramic material such as alumina, mullite, zirconia, yttria, a cermet, sapphire, or steatite.

The glass sealing body 3 is made of lead-free borosilicate glass which does not contain lead and is added with boron oxide. The glass sealing body 3 is formed in a shape of an ellipsoidal sphere. The linear expansion coefficient $\alpha_g$ of the glass sealing body 3 is $8.5 \times 10^{-6}/°$ C. The glass sealing body 3 is formed so as to cover the thermo-sensitive element 2 and the distal end portions of the element electrode wires 21. The thickness t of the glass sealing body 3 is in the range of $0.4$ mm$\leq t \leq 3.0$ mm. The surface of the glass sealing body 3 is treated such that the depths of minute cracks therein are smaller than 10 μm.

Figure 3:
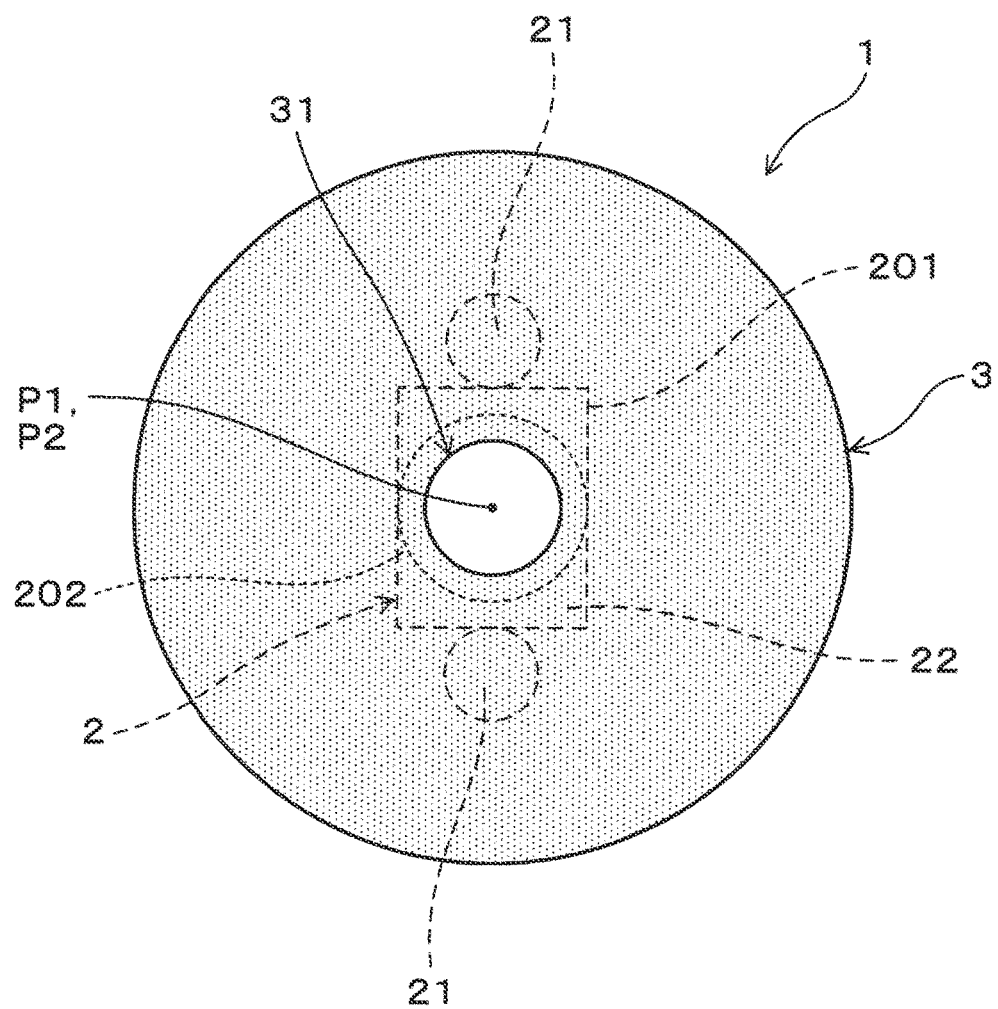
FIG. 3 is a cross-sectional view of FIG. 1 taken along line III-III.

As shown in FIGS. 1 to 3, the air bubble 31 is present inside the glass sealing body 3. The air bubble 31 has a spherical shape, and is located at a position opposite to the distal end surface 22 of the thermo-sensitive element 2. The diameter R of the air bubble 31 is 0.2 mm. When the diameter of the inscribed circle 202 inscribed within the outline 201 of the thermo-sensitive element 2 is R0, the relationship of R=0.4R0 is satisfied. The air bubble 31 is within the outline 201 of the thermo-sensitive element 2 when viewed in the axial direction X. The center P1 of the air bubble 31 and the center P2 of the thermo-sensitive element 2 overlap with each other.

Next, a process of manufacturing the temperature sensor 1 having the above described structure is explained. The thermo-sensitive element 2 and the pair of the element electrode wires 21 are joined to each other in advance. The pair of the element electrode wires 21 are inserted into the insertion holes 41 of the table 4. At this time, the pair of the element electrode wires 21 and the tablet 4 are temporarily fixed to each other by a glass paste such that the distance between the distal end surface 22 of the thermo-sensitive element 2 and the upper surface of the tablet 4 is a. Here, it is assumed that the maximum width between the element electrode wires 21 in their arranging direction is P, and the outside diameter of the tablet 4 is I.

Next, the thermo-sensitive element 2 and one end portion of each of the pair of the element electrode wires 21 are inserted into a glass tube 30 of a cylindrical shape for forming the glass sealing body 3, and then this glass tube 30 is placed on the upper surface of the tablet 4 such that the central axis of the tablet 4 and the central axis of the glass tube 30 are coaxial with each other. In this embodiment, it is assumed that the entire length of the glass tube 30 in the axial direction is L, and the inside and outside diameters of the glass tube 30 are d1 and d2 (d1<d2), respectively. The entire length L is in the range of $1.5a \leq L \leq 3a$, the inside diameter d1 is in the range of $1.1P \leq d1 \leq 2P$, and the outside diameter d2 is in the range of $1.5d1 \leq d2 \leq 2.5d1$. By forming the glass sealing body 3 by melting the glass tube 30 so as to satisfy the above described dimensional relationships, the air bubble 31 can be formed reliably such that the center of the air bubble 31 is located within the outline 201 of the thermo-sensitive element 2.

Next, the glass tube 30 is melted to form the glass sealing body. More specifically, the glass tube 30 placed on the tablet 4 is placed in a heating furnace. The temperature in the heating furnace is increased at a rate of 300° C./s until it reaches approximately 900° C., and then maintained constant for about 20 seconds. At this time, the glass tube 30 is heated with such a temperature gradient that the temperature of the proximal end portion on the side of the tablet 4 is approximately 850° C. and the temperature of the distal end portion on the side opposite to the tablet 4 is approximately 900° C. This makes it possible to melt the glass tube 30 from its distal end side so that unnecessary air within the glass tube 30 can be discharged through the insertion holes 41 of the tablet 4, to thereby form the air bubble 31 having an appropriate volume within the glass sealing body 31.

The above described embodiment provides the following advantages. In a conventional glass sealing body in which an air bubble like the air bubble 31 is not formed, it is easy to ensure a sufficient thickness in the axial direction, however, it is not easy to ensure a sufficient thickness in the radial direction perpendicular to the X direction. Forming the air bubble 31 at a position on the distal end side within the glass sealing body 3 makes it possible to utilize the glass material having been replaced by the air bubble 31 for increasing the thickness in the radial direction. Accordingly, the glass sealing body 3 can be formed efficiently in a well-balanced shape to have a high strength. The center P1 of the air bubble 31 when viewed in the axial direction X is located within the outline 201 of the thermo-sensitive element 2. Accordingly, it is possible that the thickness of the glass sealing body 3 can be prevented from becoming too small locally due to the formation of the air bubble 31.

Since part of the glass sealing body 3 is replaced by the air bubble 31 formed of air which is extremely light compared to the glass material, the amount of the glass material necessary to form the glass sealing body 3 can be reduced.

The external shape of the air bubble 31 is located within the outline 201 of the thermo-sensitive element 2 when viewed in the axial direction X. Accordingly, the thickness of the glass sealing body 3 surrounding the thermo-sensitive element 2 can be made uniform to increase the strength of the glass sealing body 3.

The diameter R of the air bubble 31 and the diameter R0 of the inscribed circle 202 inscribed within the outline 201 satisfy the relationship of $0 < R \leq 2R0$. Accordingly, it is possible to ensure that the glass sealing body 3 has a sufficient strength, and to reduce the amount of the glass material necessary to form the glass sealing body 3. Preferably, the diameter R of the air bubble 31 and the diameter R0 of the inscribed circle 202 satisfies the relationship of $0.1R0 \leq R \leq R0$ to ensure a sufficient thickness of the glass sealing body 3 while ensuring a sufficient strength.

The glass sealing body 3 is made of borosilicate glass to which boron oxide is added. This makes it possible to increase the resistivity of the glass sealing body 3 to thermal shock to thereby prevent the glass sealing body 3 from being damaged.

Preferably, the glass sealing body 3 is made of lead-free glass, so that the strength of the glass sealing body can be increased easily.

The element electrode wire 21 is made of platinum alloy containing iridium, and the content A of iridium is in the range of $0$ wt %$< A \leq 20$ wt %. Accordingly, since the linear expansion coefficients of the glass sealing body 3 and the element electrode wire 21 can be made sufficiently closer to each other, the glass sealing body 3 can be prevented from being damaged due to the difference between their linear expansion coefficients. In addition, the strength of the element electrode wire 21 can be increased easily.

The linear expansion coefficient $\alpha_g$ of the glass sealing body 3 and the linear expansion coefficient $\alpha_r$ of the element electrode wire 21 satisfy the relationship of $\alpha_g-1$ ($10^{-6}/°$ C.)$\leq \alpha_r \leq \alpha_g+1$ ($10^{-6}/°$ C.). Accordingly, since the linear expansion coefficients of the glass sealing body 3 and the element electrode wire 21 are sufficiently close to each other, it is possible to suppress the thermal stress between them.

As explained above, according to this embodiment, the amount of the glass material for forming the glass sealing body 3 can be reduced while ensuring a sufficient strength of the glass sealing body 3.

Figure 4:
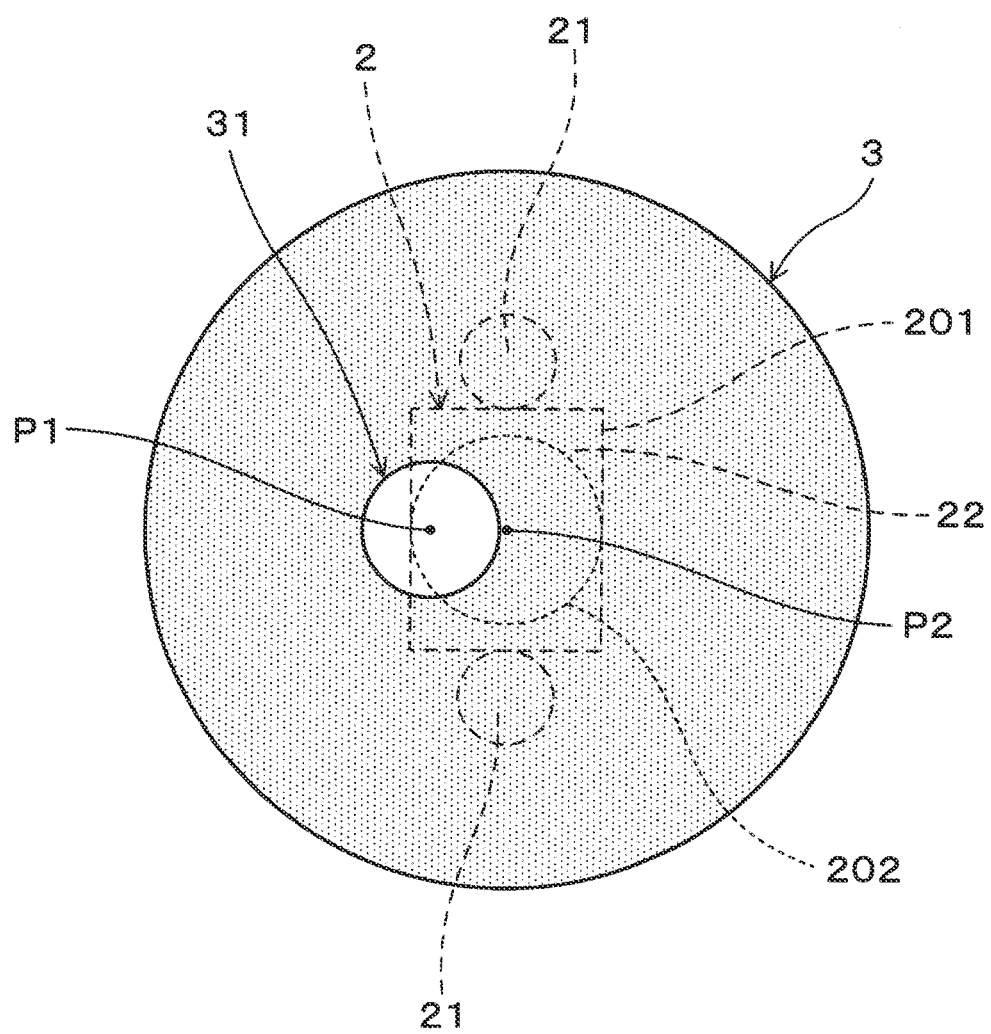
FIG. 4 is a diagram for explaining the structure of a modification of the temperature sensor according to the embodiment of the invention.
Figure 5:
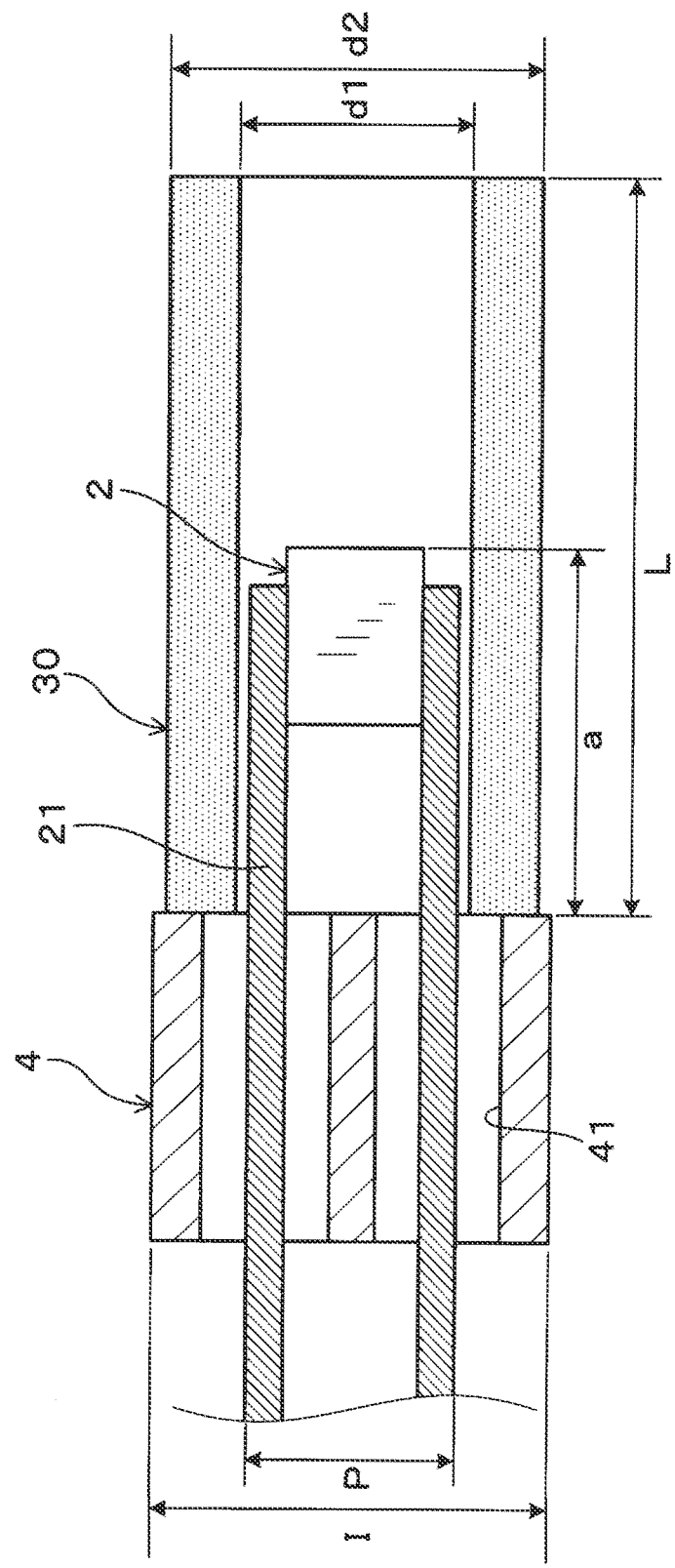
FIG. 5 is a diagram for explaining a process of manufacturing the temperature sensor according to the embodiment of the invention.

In this embodiment, the center P1 of the air bubble 31 and the center P2 of the thermo-sensitive element 2 overlap with each other when viewed in the axial direction X. However, the center P1 of the air bubble 31 and the center P2 of the thermo-sensitive element 2 may be located at positions which do not overlap with each other as shown in FIG. 4. Still in this case, it is preferable that the center P1 of the air bubble 31 is within the outline 201 of the thermo-sensitive element 2.

The effect of increasing the thickness of the glass sealing body 3 by forming the air bubble 31 depends on the positional relationship between the thermo-sensitive element 2 and the air bubble 31. This positional relationship greatly depends on the inclination angle of the distal end surface 22 of the thermo-sensitive element 2 to the horizon. Accordingly, it is preferable that the inclination angle of the distal end surface 22 to the horizon is smaller than or equal to 30° C. If the inclination angle exceeds 30° C., there is a concern that the air bubble 31 may be displaced in position or may become insufficient in size.

The above explained preferred embodiments are exemplary of the invention of the present application which is described solely by the claims appended below. It should be understood that modifications of the preferred embodiments may be made as would occur to one of skill in the art.

What is claimed is:

1. A temperature sensor comprising:
   a thermo-sensitive element;
   a pair of element electrode wires electrically connected to the thermo-sensitive element;
   a sealing body covering the thermo-sensitive element and part of the pair of the element electrode wires; and
   a tablet formed with a pair of insertion holes through which the pair of the element electrode wires pass, wherein
   an air bubble is formed at a position within the glass sealing body on a distal end side opposite to the tablet,
   a center of the air bubble is located within an outline of the thermo-sensitive element when viewed in an axial direction of the pair of the element electrode wires, and
   an external shape of the air bubble is located within the outline of the thermo-sensitive element when viewed in the axial direction.

2. The temperature sensor according to claim 1, wherein, when a diameter of the air bubble is R and a diameter of an inscribed circle inscribed within the outline is R0, a relationship of 0<R$\leq$2R0 is satisfied.

3. The temperature sensor according to claim 1, wherein the glass sealing body is made of borosilicate glass with added boron oxide.

4. The temperature sensor according to claim 1, wherein the glass sealing body is made of lead-free glass.

5. The temperature sensor according to claim 1, wherein the element electrode wire is made of platinum or platinum alloy containing iridium, and a content A of iridium contained in the platinum alloy is in a range of 0 wt %<A$\leq$20 wt %.

6. The temperature sensor according to claim 1, wherein when a linear expansion coefficient of the glass sealing body is $\alpha_g$, and a linear expansion coefficient of the element electrode wire is $\alpha_r$, a relationship of $\alpha_g-1$ ($10^{-6}/°$ C.)$\leq \alpha_r \leq \alpha_g+1$ ($10^{-6}/°$ C.) is satisfied.

* * * * *